(12) United States Patent
Yabuki et al.

(10) Patent No.: US 9,500,921 B2
(45) Date of Patent: Nov. 22, 2016

(54) LIQUID CRYSTAL DISPLAY DEVICE WITH COMMON SIGNAL BUS LINE

(71) Applicant: Panasonic Liquid Crystal Display Co., Ltd., Himeji-shi, Hyogo (JP)

(72) Inventors: Hiroyuki Yabuki, Osaka (JP); Tomohiro Nakayama, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 277 days.

(21) Appl. No.: 14/199,194

(22) Filed: Mar. 6, 2014

(65) Prior Publication Data

US 2015/0177581 A1    Jun. 25, 2015

(30) Foreign Application Priority Data

Dec. 25, 2013    (JP) .................. 2013-266433

(51) Int. Cl.
*G02F 1/1343* (2006.01)
*G02F 1/1362* (2006.01)
*G09G 3/36* (2006.01)
*G02F 1/1345* (2006.01)

(52) U.S. Cl.
CPC ....... *G02F 1/136286* (2013.01); *G02F 1/1345* (2013.01); *G09G 3/3648* (2013.01); *G09G 3/3655* (2013.01); *G09G 2300/0426* (2013.01); *G09G 2310/02* (2013.01); *G09G 2320/0223* (2013.01)

(58) Field of Classification Search
CPC .......... G02F 1/136286; G02F 1/1345; G09G 3/3655; G09G 3/3648; G09G 2300/0426; G09G 2310/02
See application file for complete search history.

(56) References Cited

U.S. PATENT DOCUMENTS

| 5,446,568 | A | | 8/1995 | Nakazawa et al. |
| 5,831,709 | A | * | 11/1998 | Song ............... G02F 1/1362 345/100 |
| 5,854,616 | A | * | 12/1998 | Ota .................. G09G 3/3648 345/100 |
| 8,416,164 | B2 | * | 4/2013 | Hwang ........... G02F 1/13306 345/103 |
| 2014/0347590 | A1 | | 11/2014 | Fujita et al. |

FOREIGN PATENT DOCUMENTS

| JP | 3-64735 | 3/1991 |
| JP | 2001-117118 | 4/2001 |

* cited by examiner

*Primary Examiner* — Paisley L Arendt
(74) *Attorney, Agent, or Firm* — Hamre, Schumann, Mueller & Larson, P.C.

(57) ABSTRACT

In a liquid crystal display device, a TFT substrate includes a GAL layer including gate signal lines, an SDL layer including data signal lines, and a CMT layer including common signal lines and a common signal bus line. The common signal bus line is connected to, among a plurality of common potential supply terminals arranged on one side of the TFT substrate, one of common potential supply terminals that are positioned at both ends, and is connected to a common potential supply terminal on an inner side with respect to the common potential supply terminals at both the ends so as to overlap and cross with at least one of the data signal lines.

9 Claims, 10 Drawing Sheets

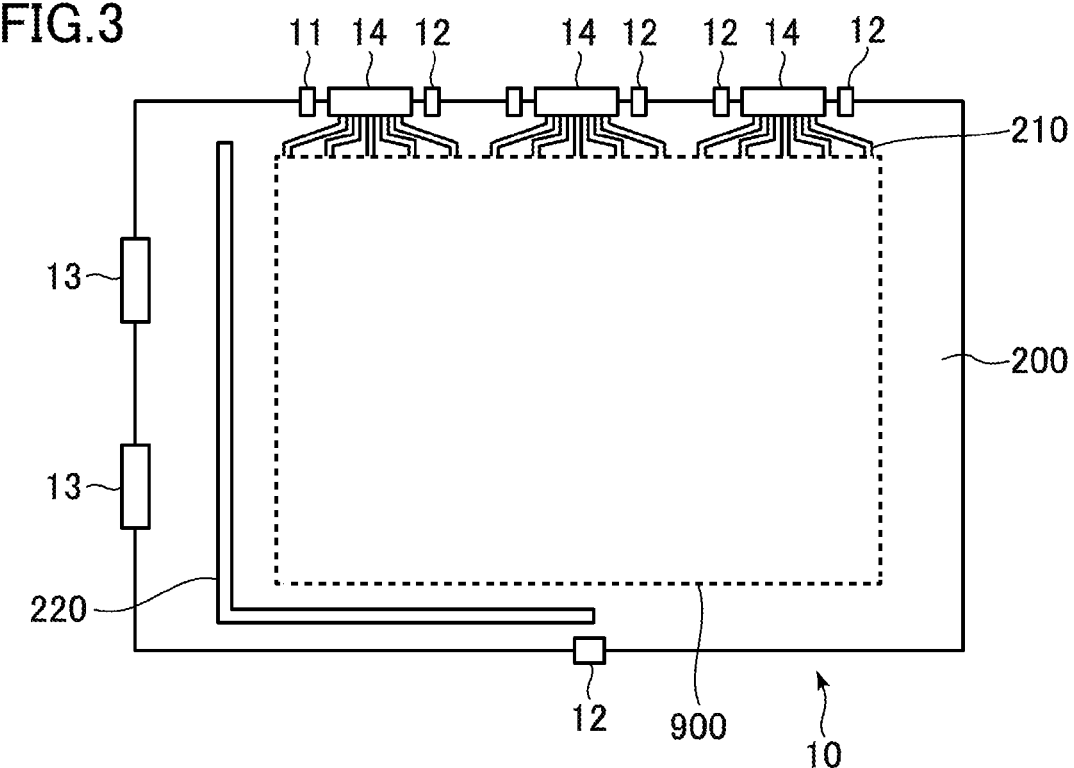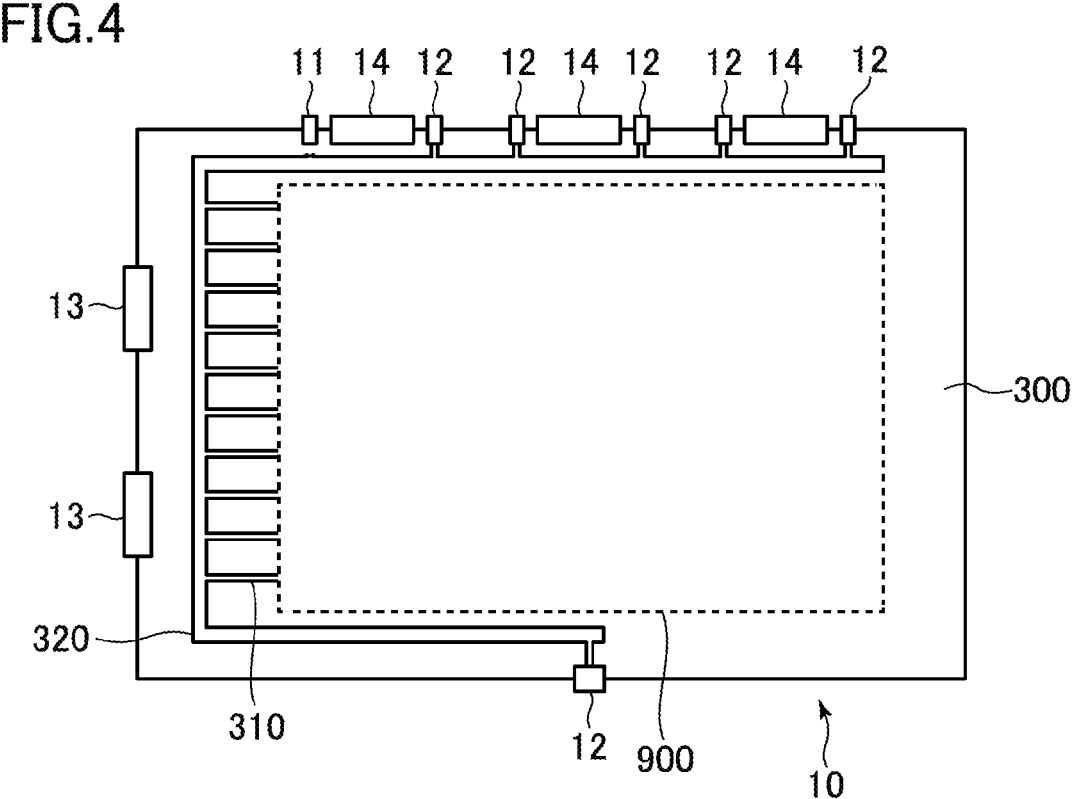

LIQUID CRYSTAL DISPLAY DEVICE WITH COMMON SIGNAL BUS LINE

CROSS-REFERENCE TO RELATED APPLICATION

The present application claims priority from Japanese application JP 2013-266433 filed on Dec. 25, 2013, the content of which is hereby incorporated by reference into this application.

TECHNICAL FIELD

The present application relates to a liquid crystal display device.

BACKGROUND

A liquid crystal display device includes a pixel electrode whose potential is controlled by a thin film transistor, a common electrode whose common potential is controlled by a common signal, and a liquid crystal layer to which an electric field generated between the pixel electrode and the common electrode is applied. In the liquid crystal display device, the potential of the pixel electrode is controlled to change the electric field to be applied to the liquid crystal layer. In this manner, transmittance/non-transmittance of light from a backlight unit through the liquid crystal layer is controlled to display an image on a display surface of the liquid crystal display device.

The screen size of the liquid crystal display device increases and the resolution becomes higher. Hence the common potential supplying performance is desired to be further increased, and a liquid crystal display device having a higher common potential supplying performance is desired.

SUMMARY

In one general aspect, the instant application describes a liquid crystal display device including a TFT substrate which includes a plurality of pixel electrodes having potentials controlled by a plurality of thin film transistors, a plurality of data signal supply terminals to which a data signal to be supplied to the plurality of thin film transistors is input, a plurality of common potential supply terminals to which a common potential is input being positioned across each other, at least one of the plurality of data signal supply terminals being located between two of the plurality of common potential supply terminals, and a common electrode to which the common potential is supplied from the plurality of common potential supply terminals. The TFT substrate includes an A wiring layer, a B wiring layer, and a C wiring layer. The B wiring layer is formed above the A wiring layer through an intermediate layer of a first insulating layer and the C wiring layer is formed above the B wiring layer through an intermediate layer of a second insulating layer. The TFT substrate has a surface including a display region in which the plurality of pixel electrodes are formed, and a non-display region that surrounds the display region and has the plurality of common potential supply terminals provided in the non-display region. A first wiring layer of the A, B, or C wiring layers includes a plurality of gate signal lines for supplying a gate signal to the plurality of thin film transistors. A second wiring layer different from the first wiring layer including the plurality of gate signal lines, includes a plurality of data signal lines for supplying the data signal to the plurality of thin film transistors. A third wiring layer different from the first wiring layer including the plurality of gate signal lines and the second wiring layer including the plurality of data signal lines include a plurality of common signal lines for supplying the common potential to the common electrode and a common signal bus line for connecting together ends of at least two of the plurality of common signal lines. The common signal bus line is connected to, among the plurality of common potential supply terminals arranged on one side of the TFT substrate, one of common potential supply terminals that are positioned at both ends. And the common signal bus line is connected to a common potential supply terminal on an inner side with respect to the common potential supply terminals at both the ends so as to overlap and cross with at least one of the plurality of data signal lines.

The above general aspect may include one or more of the following features. For example, a common signal may be supplied from the plurality of common potential supply terminals.

The A wiring layer includes the plurality of gate signal lines, the B wiring layer includes the plurality of data signal lines, and the C wiring layer includes the plurality of common signal lines and the common signal bus line.

The second wiring layer including the plurality of data signal lines includes a common potential bus line that is connected to at least one of the plurality of common signal lines and connected to another of the common potential supply terminals that are positioned at both the ends.

The plurality of common potential supply terminals are arranged along one long side of the TFT substrate.

The plurality of common potential supply terminals are arranged along two opposing long sides of the TFT substrate.

At least one of the plurality of common signal lines is arranged so as to overlap at least in part with one of the plurality of data signal lines.

At least one of the plurality of common potential supply terminals is directly connected to a common potential input portion, which is formed in the first wiring layer including the plurality of gate signal lines, and the common potential input portion is connected to the common signal bus line.

At least one of the plurality of common potential supply terminals is directly connected to a common potential input portion, which is formed in the first wiring layer including the plurality of gate signal lines. The common potential input portion is connected to at least one of the common signal bus line and the common potential bus line that are connected to each other via an interlayer connecting portion made of a conductor.

At least one of the plurality of common potential supply terminals is directly connected to a common potential input portion, which is formed in the second wiring layer including the plurality of data signal lines, and the common potential input portion is connected to the common signal bus line.

At least one of the plurality of common potential supply terminals is directly connected to a common potential input portion, which is formed in the second wiring layer including the plurality of data signal lines. The common potential input portion is connected to at least one of the common signal bus line and the common potential bus line that are connected to each other via an interlayer connecting portion made of a conductor.

The interlayer connecting portion includes a connecting portion having a planar shape, a first pass-through portion, and a second pass-through portion. The connecting portion is formed above the C wiring layer through an intermediate layer of a third insulating layer. The first pass-through portion passes through the third insulating layer to connect the connecting portion and the common signal bus line to each other. The second pass through portion passes through the third insulating layer, the C wiring layer, and the second insulating layer to connect the connecting portion and the common potential bus line to each other, each of the connecting portion, the first pass-through portion, and the second pass-through portion being made of a transparent electrode material.

The first pass-through portion of each of a plurality of the interlayer connecting portions is connected to a part of the common signal bus line, which is adjacent to one of the ends of the plurality of common signal lines.

These general and specific aspects may be implemented using a system, a method, or a computer program, or any combination of systems, methods, and computer programs. Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

FIG. 3 illustrates an exemplary configuration of an outer peripheral part of an SDL layer forming the TFT substrate of the liquid crystal display device shown in FIG. 1.

FIG. 4 illustrates an exemplary configuration of an outer peripheral part of a CMT layer forming the TFT substrate of the liquid crystal display device shown in FIG. 1.

DETAILED DESCRIPTION (First Configuration)

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
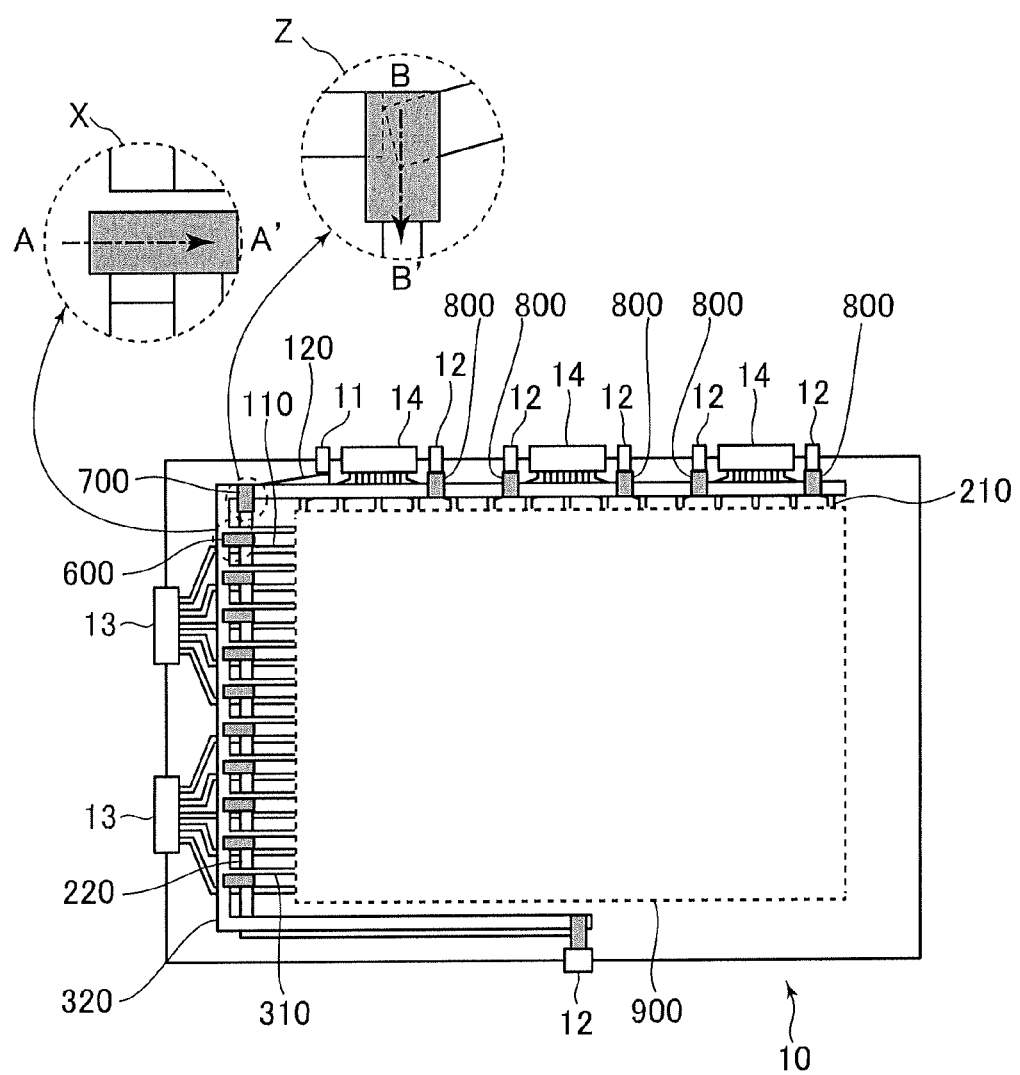
FIG. 1 illustrates an exemplary configuration of an outer peripheral part of a TFT substrate of a liquid crystal display device according to a first configuration of the present application.
Figure 2:
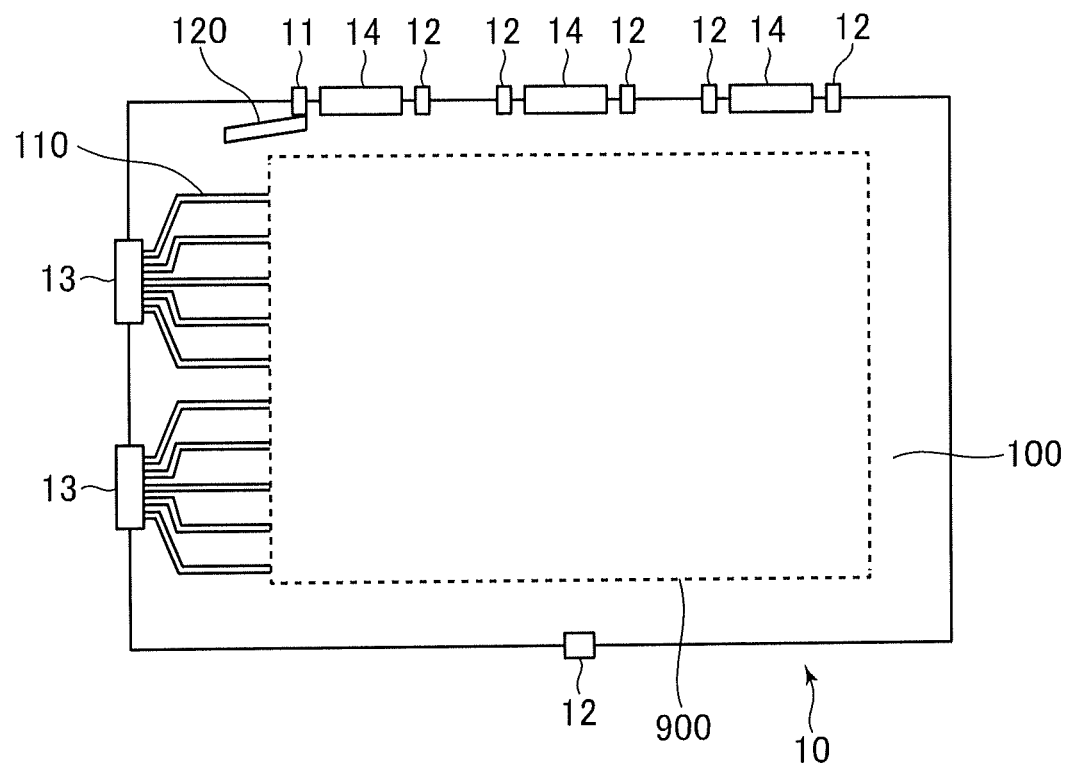
FIG. 2 illustrates an exemplary configuration of an outer peripheral part of a GAL layer forming the TFT substrate of the liquid crystal display device shown in FIG. 1.

FIG. 1 illustrates an exemplary configuration of an outer peripheral part of a TFT substrate 10 of a liquid crystal display device according to a first configuration of the present application. FIG. 2 illustrates an exemplary configuration of an outer peripheral part of a GAL layer 100 forming the TFT substrate 10 of the liquid crystal display device shown in FIG. 1. FIG. 3 illustrates an exemplary configuration of an outer peripheral part of an SDL layer 200 forming the TFT substrate 10 of the liquid crystal display device shown in FIG. 1. FIG. 4 illustrates an exemplary configuration of an outer peripheral part of a CMT layer 300 forming the TFT substrate of the liquid crystal display device shown in FIG. 1. In the configuration of the present application, a first wiring layer corresponds to the GAL layer, a second wiring layer corresponds to the SDL layer, and a third wiring layer corresponds to the CMT layer. Further, in this configuration, the SDL layer (second wiring layer) 200 is formed above the GAL layer (first wiring layer) 100 via a first insulating layer 400, and the CMT layer (third wiring layer) 300 is formed above the SDL layer (second wiring layer) 200 via a second insulating layer 500.

Figure 5:
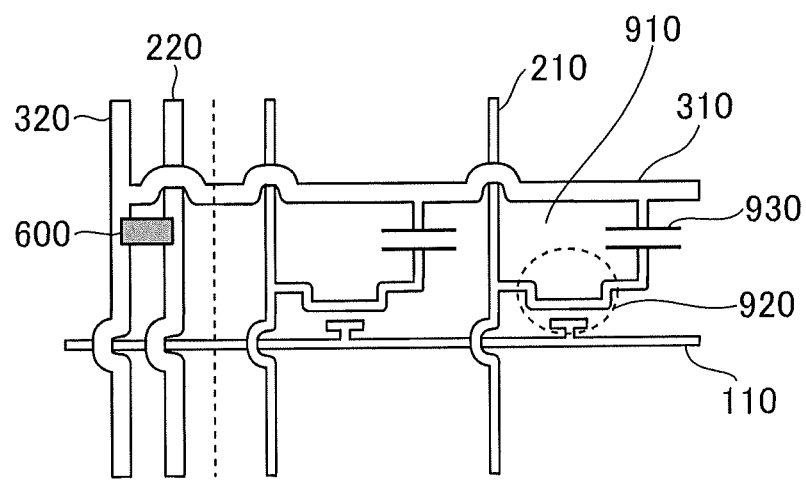
FIG. 5 illustrates an exemplary configuration of a pixel region of the TFT substrate of the liquid crystal display device shown in FIG. 1.

The TFT substrate 10 includes a plurality of gate signal lines 110 and a common signal input line 120, which are formed in the GAL layer 100, a plurality of data signal lines 210 and an SDL layer common potential bus line 220, which are formed in the SDL layer 200, and a plurality of common signal lines 310 and a common signal bus line 320 connecting together ends of the common signal lines 310, which are formed in the CMT layer 300. In the configuration of the present application, the common signal bus line 320 connects together the ends of all of the common signal lines 310. In a display region 900 represented by broken lines in FIGS. 1 to 4, the plurality of gate signal lines 110 and the plurality of data signal lines 210 form a plurality of pixel regions 910 in matrix. On the other hand, the pixel region 910 is not formed in a region surrounding the display region 900, and an image is not displayed in the region. In the following, this region is referred to as "non-display region". FIG. 5 illustrates an exemplary configuration of the pixel region 910 of the TFT substrate 10 of the liquid crystal display device shown FIG. 1. In the pixel region 910, a thin film transistor 920 that is driven by a gate signal supplied from the gate signal line 110 and a data signal supplied from the data signal line 210, are adjacent to the pixel region 910 is formed. Further, the common signal line 310 supplies a common potential to a common electrode 930.

In this case, the gate signal for driving the thin film transistor 920 is input from a gate signal supply terminal 13 and is transmitted through the gate signal line 110 of the GAL layer 100. The data signal for driving the thin film transistor 920 is input from a data signal supply terminal 14 of the TFT substrate 10 and is transmitted through the data signal line 210 of the SDL layer 200.

The common signal supplied from the common signal line 310 to the common electrode 930 is input from each of common potential supply terminals 11 and 12 of the TFT substrate 10, which are adjacent to each other via the data signal supply terminal 14.

The common potential supply terminal 11 of the TFT substrate 10 is directly connected to the common signal input line 120 formed in the GAL layer 100, and further the common signal input line 120 is connected to the SDL layer common potential bus line 220. Therefore, a common signal input from the common potential supply terminal 11 is transmitted through the SDL layer common potential bus line 220 formed in the SDL layer 200. The common signal input line 120 and the SDL layer common potential bus line 220 are connected to the common signal bus line 320 in the CMT layer 300 via an interlayer connecting portion 600. Further, the common signal bus line 320 and the common signal lines 310 are formed so as to be directly connected to each other in the CMT layer 300, and hence the common signal is input to the common signal lines 310. As illustrated in FIG. 1, the common signal bus line 320 is connected to one of the common potential supply terminals 11 and 12 that are positioned at both ends, and is connected to the common potential supply terminals 12 on an inner side with respect to the common potential supply terminals 11 and 12 at both the ends so as to overlap and cross with at least one of the data signal lines 210. That is, one of the common potential supply terminals 11 or 12 that is positioned at both the ends an end is connected to the common signal bus line 320, and the other thereof is connected to the SDL layer common potential bus line 220.

Figure 6:
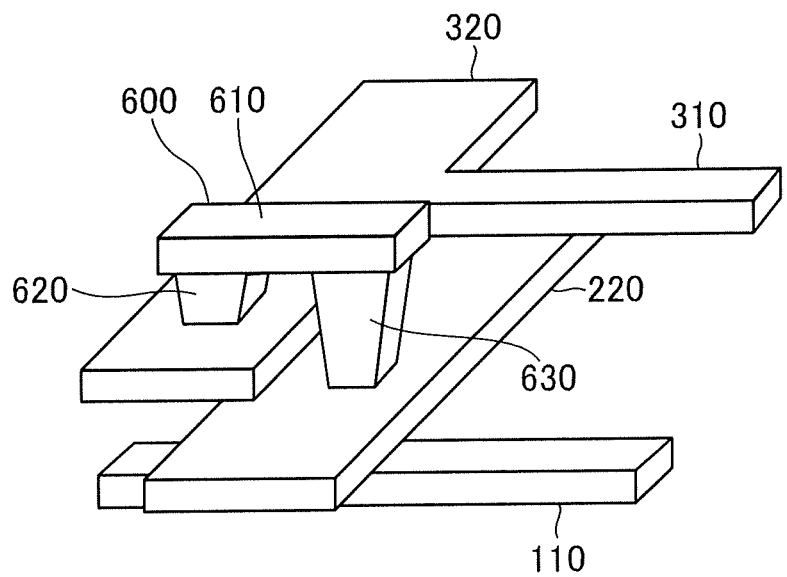
FIG. 6 illustrates an exemplary connection structure of signal lines in an X part of the TFT substrate of the liquid crystal display device shown in FIG. 1.
Figure 7:
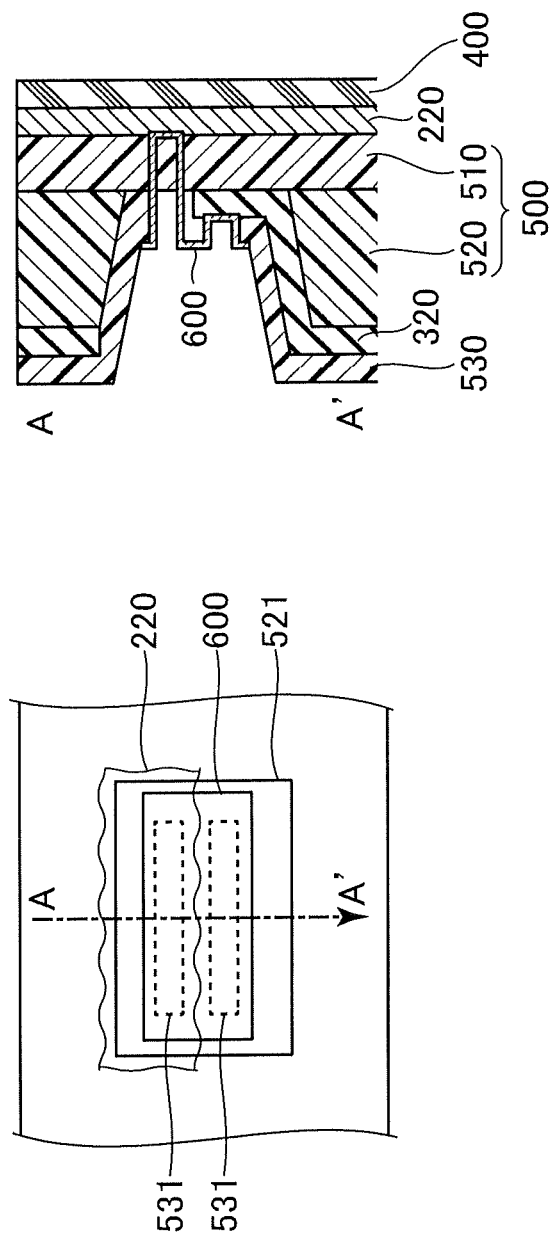
FIG. 7 illustrates an exemplary configuration of a top view structure in the X part of the TFT substrate illustrated in FIG. 1 and a sectional view illustrating a structure of a cross section taken along the line A-A' of the top view.

FIG. 6 illustrates an exemplary connection structure of signal lines in an X part of the TFT substrate 10 of the liquid crystal display device shown FIG. 1. FIG. 7 is a top view illustrating an exemplary structure of the X part of the TFT substrate 10 illustrated in FIG. 1 and a sectional view illustrating a structure of a cross section taken along the line A-A' of the top view. As illustrated in FIG. 6, the SDL layer common potential bus line 220 formed in the SDL layer 200 and the common signal bus line 320 formed in the CMT layer 300 are connected to each other by the interlayer connecting portion 600 including a planar connecting portion 610, a first pass-through portion 620, and a second pass-through portion 630. The connecting portion 610 is formed above the CMT layer 300 through intermediation of a third insulating layer 530. The first pass-through portion 620 passes through the third insulating layer 530 to connect the connecting portion 610 and the common signal bus line 320 to each other. The second pass-through portion 630 passes through the third insulating layer 530, the CMT layer 300, and the second insulating layer 500 to connect the connecting portion 610 and the SDL layer common potential bus line 220 to each other. As illustrated in FIGS. 1 and 6, the interlayer connecting portion 600 is provided at a part of the common signal bus line 320, which is adjacent to the end of the common signal line 310. The interlayer connecting portions 600 are provided as many as the common signal lines 310.

On the other hand, the common potential supply terminal 12 of the TFT substrate 10 is connected to the common signal bus line 320 formed in the CMT layer 300, and the common signal input from the common potential supply terminal 12 transmits through the common signal bus line 320.

Further, as illustrated in FIG. 7, the SDL layer common potential bus line 220 is formed on the first insulating layer 400, and the second insulating layer 500 including an inorganic PAS layer 510 made of an inorganic material and an organic PAS layer 520 made of an organic material is formed thereon. Further, the common signal bus line 320 is formed on the second insulating layer 500, and the third insulating layer 530 made of an inorganic material is formed thereon. The third insulating layer 530 has a third insulating layer opening portion 531 formed therein, and the organic PAS layer 520 has a second insulating layer opening portion 521 formed therein. The interlayer connecting portion 600 is formed thereon so as to connect the SDL layer common potential bus line 220 and the common signal bus line 320 to each other.

Figure 8:
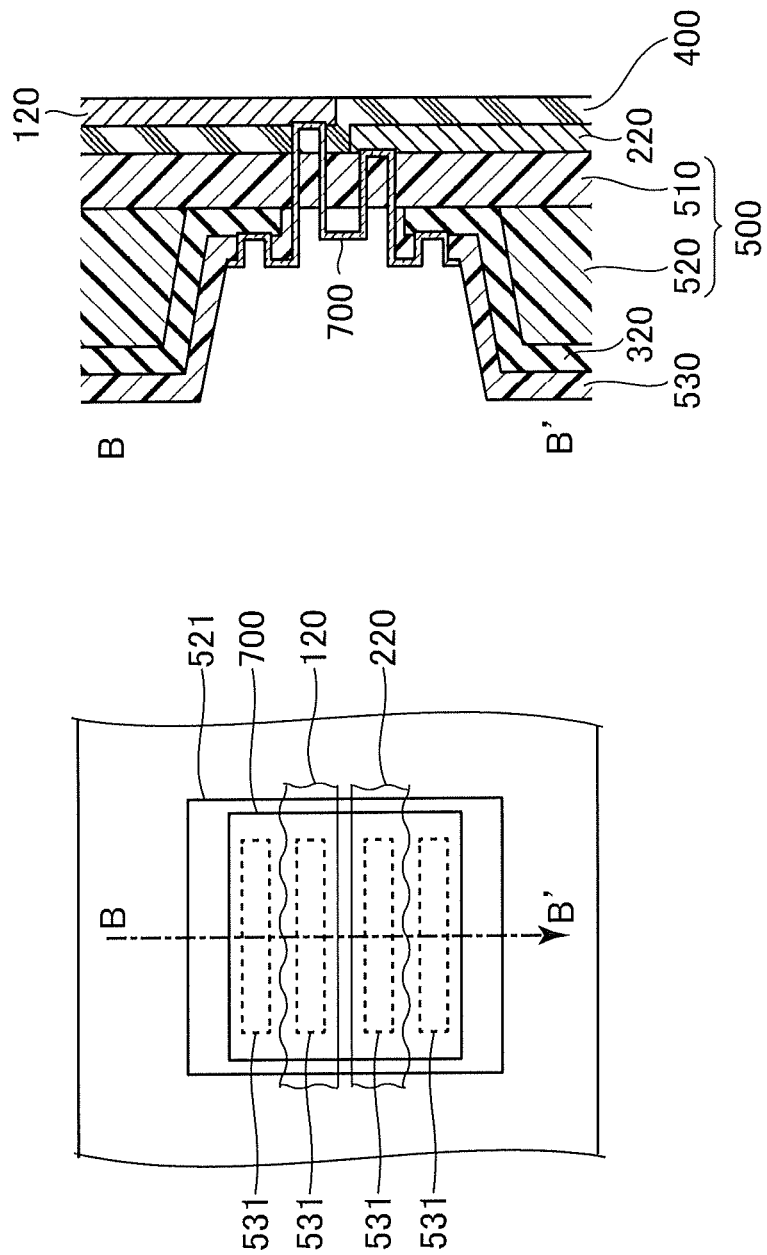
FIG. 8 illustrates an exemplary configuration of a top view illustrating a structure in a Z part of the TFT substrate illustrated in FIG. 1 and a sectional view illustrating a structure of a cross section taken along the line B-B' of the top view.

FIG. 8 illustrates an exemplary top view of a structure in a Z part of the TFT substrate 10 illustrated in FIG. 1 and an exemplary sectional view illustrating a cross section taken along the line B-B' of the top view. The SDL layer common potential bus line 220 is formed above the common signal input line 120 through intermediation of the first insulating layer 400, and the second insulating layer 500 including the inorganic PAS layer 510 made of an inorganic material and the organic PAS layer 520 made of an organic material is formed thereon. Further, the common signal bus line 320 is formed on the second insulating layer 500, and the third insulating layer 530 made of an inorganic material is formed thereon. The third insulating layer 530 has the third insulating layer opening portion 531 formed therein, and the organic PAS layer 520 has the second insulating layer opening portion 521 formed therein. An interlayer connecting portion 700 is formed thereon to connect the common signal input line 120 and the SDL layer common potential bus line 220 to each other.

Note that, in the respective figures described above, for the sake of easy understanding of the configuration, a configuration in which the common signal bus line 320 does not overlap with the SDL layer common potential bus line 220 is illustrated, but with a configuration in which those bus lines overlap with each other at least in part, the display region 900 can be further increased.

According to the above-mentioned configuration, the common signal is supplied from the common potential supply terminal 11 and the plurality of common potential supply terminals 12, and hence a liquid crystal display device having a higher common potential supply performance is provided.

(Second Configuration)

Figure 9:
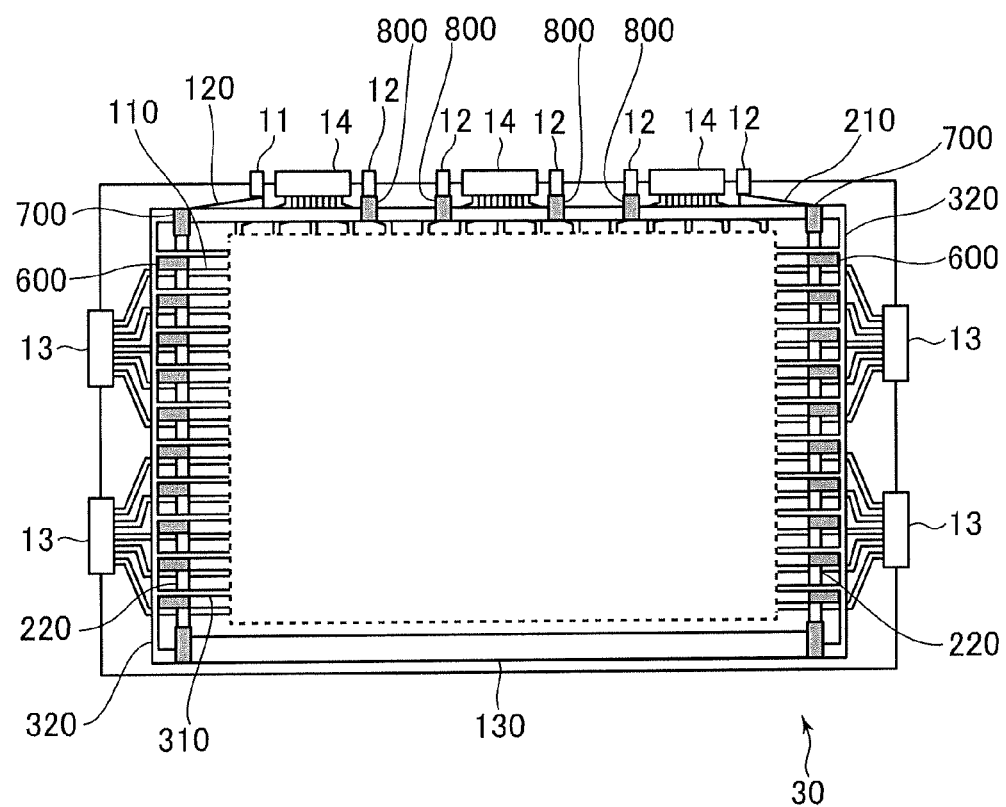
FIG. 9 illustrates an exemplary configuration of a TFT substrate of a liquid crystal display device according to a second configuration of the present application.

FIG. 9 illustrates an exemplary configuration of a TFT substrate 30 of a liquid crystal display device according to a second configuration of the present application. Only points different from the first configuration are described, and description of the same point is omitted. This configuration differs from the first configuration in that the gate signal supply terminal 13, the SDL layer common potential bus line 220, and the like are provided on two opposing sides (short sides) of the TFT substrate 30. Further, a GAL layer common potential bus line 130 is provided. In this configuration, the number of positions to which the common potential is supplied from the common potential supply terminals 11 and 12 is further increased, and hence the common potential supplying resistance can be further reduced. In addition, the current value per each of the common potential supply terminals 11 and 12 can be further reduced. Therefore, the common signal is supplied from the common potential supply terminal 11 and the plurality of common potential supply terminals 12, and hence as compared to the related-art configuration in which the common signal is supplied from one common potential supply terminal 11, a liquid crystal display device having a higher common potential supply performance is provided.

(Third Configuration)

Figure 10:
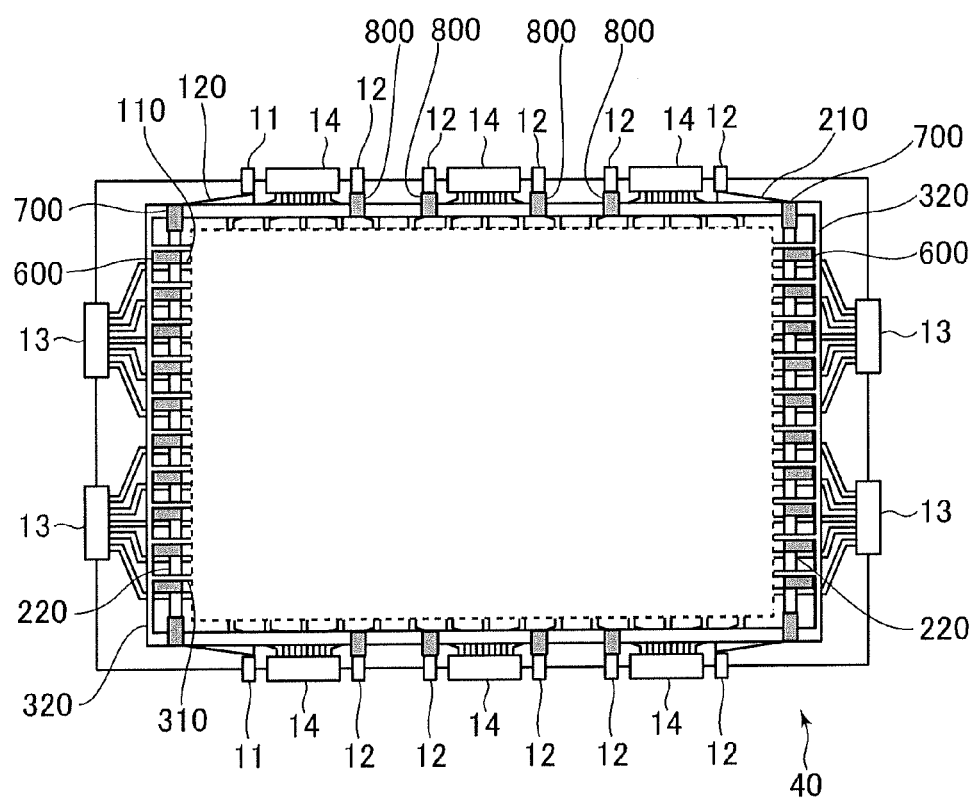
FIG. 10 illustrates an exemplary configuration of a TFT substrate of a liquid crystal display device according to a third configuration of the present application.

FIG. 10 illustrates an exemplary configuration of a TFT substrate 40 of a liquid crystal display device according to a third configuration of the present application. Only points different from the first configuration are described, and description of the same point is omitted. This configuration differs from the first configuration in that the gate signal supply terminal 13, the SDL layer common potential bus line 220, and the like are provided on two opposing sides (short sides) of the TFT substrate 30, and the data signal supply terminal 14 and the common potential supply terminals 11 and 12 are provided on two opposing sides (long sides) of the TFT substrate 30. In this configuration, the number of positions to which the common potential is supplied from the common potential supply terminals 11 and 12 is further increased, and hence the common potential supplying resistance can be further reduced. In addition, the current value per each of the common potential supply terminals 11 and 12 can be further reduced. Therefore, the common signal is supplied from the common potential supply terminal 11 and the plurality of common potential supply terminals 12, and hence a liquid crystal display device having a higher common potential supply performance is provided.

(Fourth Configuration)

Figure 11:
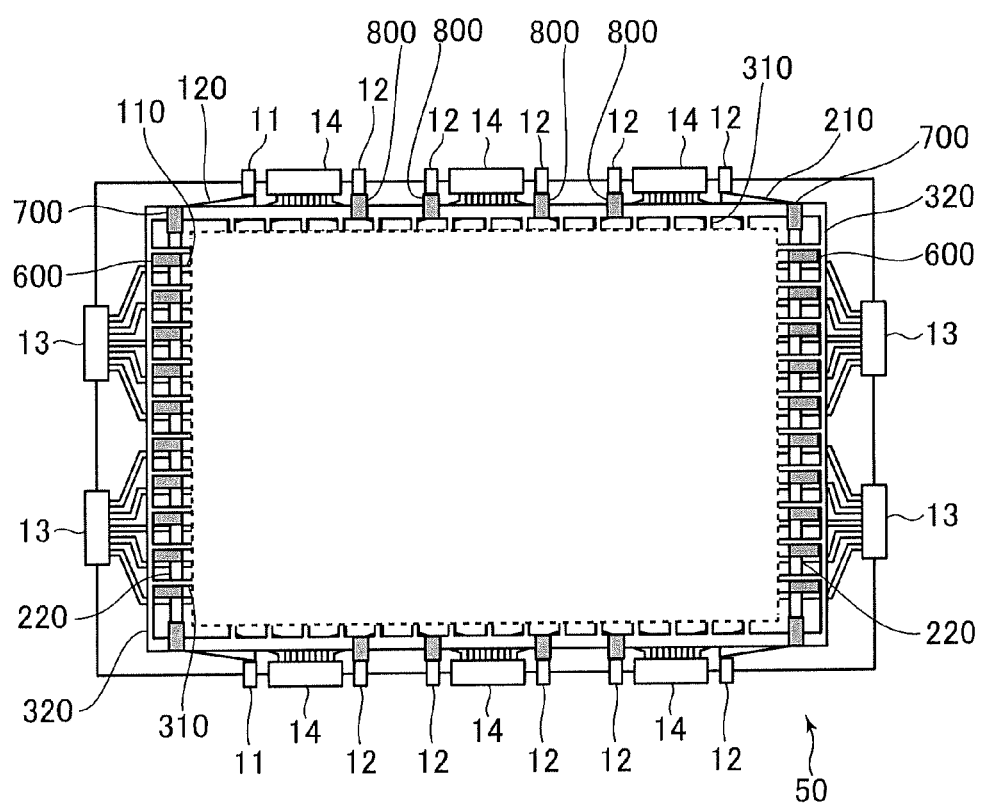
FIG. 11 illustrates an exemplary configuration of a TFT substrate of a liquid crystal display device according to a fourth configuration of the present application.

FIG. 11 illustrates an exemplary configuration of a TFT substrate 50 of a liquid crystal display device according to a fourth configuration of the present application. Only points different from the first configuration are described, and description of the same point is omitted. This configuration differs from the first configuration in that the gate signal supply terminal 13, the SDL layer common potential bus line 220, and the like are provided on two opposing sides (short sides) of the TFT substrate 30, and the data signal supply terminal 14 and the common potential supply terminals 11 and 12 are provided on two opposing sides (long sides) of the TFT substrate 30. Further, the common signal lines 310 are formed in vertical and lateral directions of the TFT substrate 30. The common signal line 310 formed in the vertical direction is formed so as to overlap at least in part with the data signal line 210 formed in the vertical direction. In this configuration, the number of positions to which the common potential is supplied from the common potential supply terminals 11 and 12 is further increased, and hence the common potential supplying resistance can be further reduced. In addition, the current value per each of the common potential supply terminals 11 and 12 can be further reduced. Therefore, the common signal is supplied from the common potential supply terminal 11 and the plurality of common potential supply terminals 12, and hence a liquid crystal display device having a higher common potential supply performance is provided. Further, the common signal lines 310 are formed in the vertical and lateral directions, and hence the difference in resistance between the pixels can be further reduced.

(Fifth Configuration)

Figure 12:
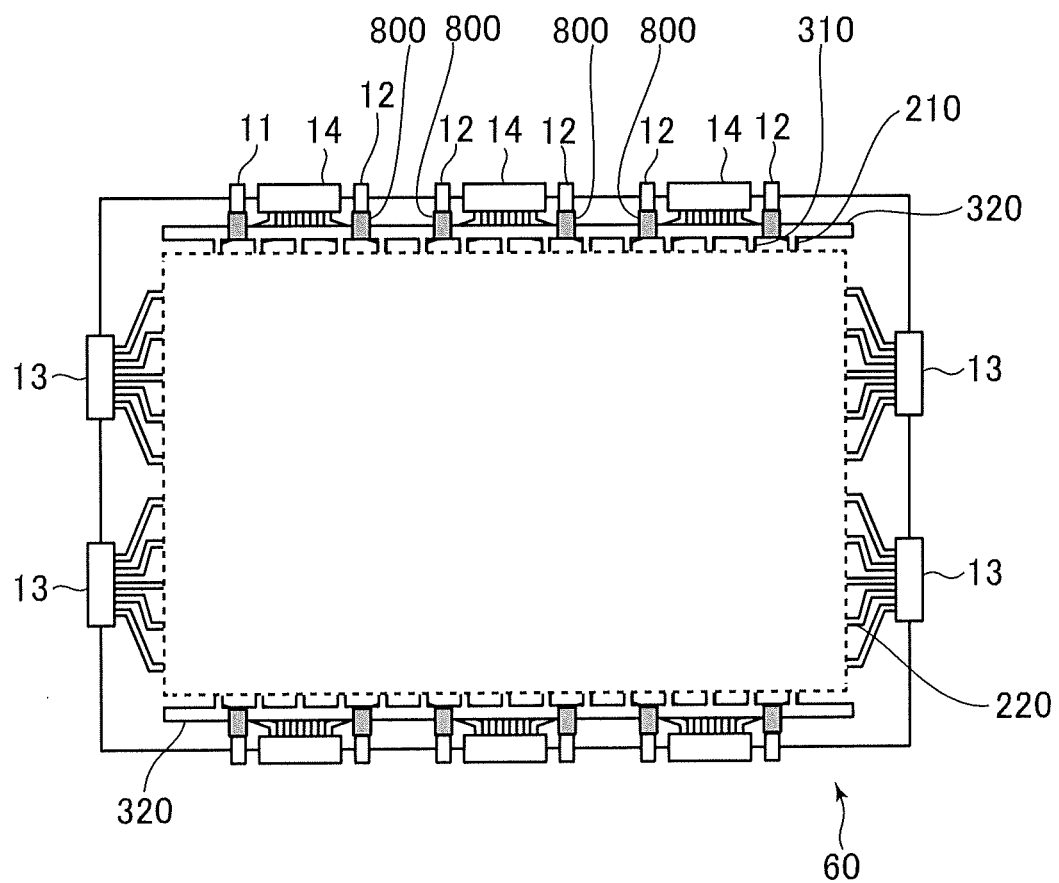
FIG. 12 illustrates an exemplary configuration of a TFT substrate of a liquid crystal display device according to a fifth configuration of the present application.

FIG. 12 illustrates an exemplary configuration of a TFT substrate 60 of a liquid crystal display device according to a fifth configuration of the present application. Only points different from the first configuration are described, and description of the same point is omitted. This configuration differs from the TFT substrate 10 of the first configuration in that the gate signal supply terminal 13 is provided on two opposing sides (short sides) of the TFT substrate 60, and the data signal supply terminal 14 and the common potential supply terminals 11 and 12 are provided on two opposing sides (long sides) of the TFT substrate 30, and in that the common signal bus line 320 is formed only in a lateral direction of the TFT substrate 60, and the common signal line 310 is formed only in a vertical direction of the TFT substrate 60. The common signal line 310 formed in the vertical direction is formed so as to overlap at least in part with the data signal line 210 formed in the vertical direction. In this configuration, the common signal bus line 320 and the SDL layer common potential bus line 220 in the vertical direction, and the GAL layer common potential bus line 130 can be omitted, and hence the frame can be narrowed. Further, the distance between the common potential supply terminal 11 and the common signal line 310 is further reduced, and hence the common potential can be supplied more efficiently. Therefore, the common signal is supplied from the common potential supply terminal 11 and the plurality of common potential supply terminals 12, and hence a liquid crystal display device having a higher common potential supply performance is provided.

Other Modified Example

The present application is described by way of the first to fifth configurations above, but it is needless to say that the present application may encompass various configurations that have been changed without departing from the gist of the present application.

For example, in the above-mentioned respective configurations, a layer (SDL layer 200) including the data signal lines 210 and the SDL layer common potential bus line 220 is formed above a layer (GAL layer 100) including the gate signal lines 110, the common signal input line 120, and the GAL layer common potential bus line 130, and a layer (CMT layer) including the common signal lines 310 and the common signal bus line 320 is further formed thereon. However, the present application is not limited to this configuration. For example, the upper and lower relationships among those layers may be reversed, or as long as the configuration includes the interlayer connecting portion 600 or an interlayer connecting portion 800, members provided in the same layer in the above-mentioned configuration may be provided in different layers. Further, the configuration may include only one of the interlayer connecting portion 600 and the interlayer connecting portion 800.

Further, in the above-mentioned respective configurations, the common signal bus line 320, the GAL layer common potential bus line 130, and the SDL layer common potential bus line 220 are formed in the short-side direction (along the short side) of the TFT substrate 10, but the present application is not limited thereto. For example, the common signal bus line 320 may be formed along the long-side direction of the TFT substrate 10, and in this case, the common potential supply terminals 11 and 12 may be arranged in the long-side direction of the TFT substrate 10.

Further, in the above-mentioned respective configurations, the common signal input line 120 that is directly connected to the common potential supply terminal 11 is formed in the GAL layer 100 including the gate signal lines 110, but the present application is not limited to this configuration. For example, the common signal input line 120 may be formed in the SDL layer 200 including the data signal lines 210.

While there have been described what are at present considered to be certain configurations of the invention, it will be understood that various modifications may be made thereto, and it is intended that the append claims cover all such modifications as fall within the true spirit and scope of the invention.

What is claimed is:

1. A liquid crystal display device, comprising a thin film transistor (TFT) substrate comprising:
    a plurality of pixel electrodes having potentials controlled by a plurality of thin film transistors;
    a plurality of data signal supply terminals to which a data signal to be supplied to the plurality of thin film transistors is input;
    a plurality of common potential supply terminals to which a common potential is input, at least one of the plurality of data signal supply terminals being located between two of the plurality of common potential supply terminals; and
    a common electrode to which the common potential is supplied from the plurality of common potential supply terminals,
    wherein the TFT substrate comprises:
        an A wiring layer;
        a B wiring layer, which is formed above the A wiring layer through an intermediate layer of a first insulating layer; and
        a C wiring layer, which is formed above the B wiring layer through an intermediate layer of a second insulating layer,
    wherein the TFT substrate has a surface including a display region in which the plurality of pixel electrodes are formed and a non-display region that surrounds the display region, the non-display region having the plurality of common potential supply terminals provided in the non-display region,
    wherein a first wiring layer of the A, B, or C wiring layers comprises a plurality of gate signal lines for supplying a gate signal to the plurality of thin film transistors,
    wherein a second wiring layer different from the first wiring layer comprising the plurality of gate signal lines, comprises a plurality of data signal lines for supplying the data signal to the plurality of thin film transistors,
    wherein a third wiring layer different from the first wiring layer comprising the plurality of gate signal lines and the second wiring layer comprising the plurality of data signal lines, comprises:
        a plurality of common signal lines for supplying the common potential to the common electrode; and
        a common signal bus line for connecting together ends of at least two of the plurality of common signal lines, and
    wherein the plurality of common potential supply terminals are arranged along one side of the TFT substrate, and the common signal bus line is connected to a first common potential supply terminal positioned at a first end of the plurality of common supply terminals,
    wherein the second wiring layer comprising the plurality of data signal lines includes a common potential bus line that is connected to a second common potential supply terminal positioned at a second end of the plurality of common potential supply terminals,
    wherein the common signal bus line and the common potential bus line are connected to each other via an interlayer connecting portion made of a conductor,
    wherein the interlayer connecting portion comprises:
        a connecting portion having a planar shape, which is formed above the C wiring layer through an intermediate layer of a third insulating layer;
        a first pass-through portion that passes through the third insulating layer to connect the connecting portion and the common signal bus line to each other; and
        a second pass-through portion that passes through the third insulating layer, the C wiring layer, and the second insulating layer to connect the connecting portion and the common potential bus line to each other,
    each of the connecting portion, the first pass-through portion, and the second pass-through portion being made of a transparent electrode material.

2. The liquid crystal display device according to claim 1, wherein the A wiring layer comprises the plurality of gate signal lines,
    wherein the B wiring layer comprises the plurality of data signal lines, and
    wherein the C wiring layer comprises the plurality of common signal lines and the common signal bus line.

3. The liquid crystal display device according to claim 1, wherein the plurality of common potential supply terminals are arranged along one long side of the TFT substrate.

4. The liquid crystal display device according to claim 1, wherein the plurality of common potential supply terminals are arranged along two opposing long sides of the TFT substrate.

5. The liquid crystal display device according to claim 1, wherein at least one of the plurality of common signal lines is arranged so as to overlap at least in part with one of the plurality of data signal lines.

6. The liquid crystal display device according to claim 1, wherein at least one of the plurality of common potential supply terminals is connected to a common potential input portion, which is formed in the first wiring layer comprising the plurality of gate signal lines, and
    wherein the common potential input portion is connected to at least one of the common signal bus line and the common potential bus line that are connected to each other via the interlayer connecting portion.

7. The liquid crystal display device according to claim 1, wherein at least one of the plurality of common potential supply terminals is directly connected to a common potential input portion, which is formed in the second wiring layer comprising the plurality of data signal lines, and
    wherein the common potential input portion is connected to at least one of the common signal bus line and the common potential bus line that are connected to each other via the interlayer connecting portion made of a conductor.

8. The liquid crystal display device according to claim 1, wherein the first pass-through portion of each of a plurality of the interlayer connecting portions is connected to a part of the common signal bus line, which is adjacent to one of the ends of the plurality of common signal lines.

9. A liquid crystal display device, comprising a thin film transistor (TFT) substrate comprising:
    a plurality of pixel electrodes having potentials controlled by a plurality of thin film transistors;
    a plurality of data signal supply terminals to which a data signal to be supplied to the plurality of thin film transistors is input;
    a plurality of common potential supply terminals to which a common potential is input, at least one of the plurality of data signal supply terminals being located between two of the plurality of common potential supply terminals; and a common electrode to which the common potential is supplied from the plurality of common potential supply terminals, wherein the TFT substrate comprises:
  an A wiring layer;
  a B wiring layer, which is formed above the A wiring layer through an intermediate layer of a first insulating layer; and
  a C wiring layer, which is formed above the B wiring layer through an intermediate layer of a second insulating layer, wherein the TFT substrate has a surface including a display region in which the plurality of pixel electrodes are formed and a non-display region that surrounds the display region, the non-display region having the plurality of common potential supply terminals provided in the non-display region, wherein a first wiring layer of the A, B, or C wiring layers comprises a plurality of gate signal lines for supplying a gate signal to the plurality of thin film transistors, wherein a second wiring layer different from the first wiring layer comprising the plurality of gate signal lines, comprises a plurality of data signal lines for supplying the data signal to the plurality of thin film transistors, wherein a third wiring layer different from the first wiring layer comprising the plurality of gate signal lines and the second wiring layer comprising the plurality of data signal lines, comprises:
  a plurality of common signal lines for supplying the common potential to the common electrode; and
  a common signal bus line for connecting together ends of at least two of the plurality of common signal lines, and wherein the common signal bus line is connected to a first common potential supply terminal among the plurality of common supply terminals, wherein the second wiring layer comprising the plurality of data signal lines includes a common potential bus line that is connected to a second common potential supply terminal among the plurality of common supply terminals, wherein the common signal bus line and the common potential bus line are connected to each other via an interlayer connecting portion made of a conductor, wherein the interlayer connecting portion comprises:
a connecting portion having a planar shape, which is formed above the C wiring layer through an intermediate layer of a third insulating layer;
a first pass-through portion that passes through the third insulating layer to connect the connecting portion and the common signal bus line to each other; and
a second pass-through portion that passes through the third insulating layer, the C wiring layer, and the second insulating layer to connect the connecting portion and the common potential bus line to each other,
each of the connecting portion, the first pass-through portion, and the second pass-through portion being made of a transparent electrode material.

* * * * *